United States Patent

Erickson

[15] 3,660,777

[45] May 2, 1972

[54] LASER PULSE TIME MODULATION Q-SWITCH

[72] Inventor: Allen M. Erickson, Silver Spring, Md.

[73] Assignee: The United States of America as represented by the Secretary of the Navy

[22] Filed: Apr. 16, 1971

[21] Appl. No.: 134,790

[52] U.S. Cl. ............................................331/94.5, 350/160
[51] Int. Cl. ..........................................................H01s 3/11
[58] Field of Search .................................331/94.5; 350/160

[56] References Cited

UNITED STATES PATENTS 3,339,073  8/1967  Hunter..................................331/94.5
3,473,030  10/1969  Mevers et al. .........................331/94.5

Primary Examiner—William L. Sikes
Attorney—R. S. Sciascia, J. A. Cooke, R. J. Erickson and K. E. Krosin

[57] ABSTRACT

Apparatus for Q-switching a carbon dioxide laser which operates on the scanning Fabry-Perot principle to affect a laser switching. At both ends of a laser cavity are positioned 100 percent reflective mirrors perpendicular to the laser beam. A pulse time modulation Q-switch is placed in the laser cavity which produces laser output pulses of fixed amplitude and width, but of varying frequency. The pulse time modulation, Q-switch is contained in a sandwich that includes a piezoelectric crystal, a germanium wedge, one of the end mirrors, a second germanium wedge, a Fabry-Perot interferometer, and a third germanium wedge. The Fabry-Perot interferometer, which is positioned within the laser cavity, is at a slight angle to the laser beam, while the 100 percent reflective mirror is perpendicular to the laser beam. Voltage pulses applied to the piezoelectric crystal cause the Fabry-Perot interferometer to change from a highly reflective state to a highly transmissive state, whereupon lasing occurs. When the Fabry-Perot interferometer changes back to its highly reflective state, a laser pulse is fed out of the laser cavity.

12 Claims, 1 Drawing Figure

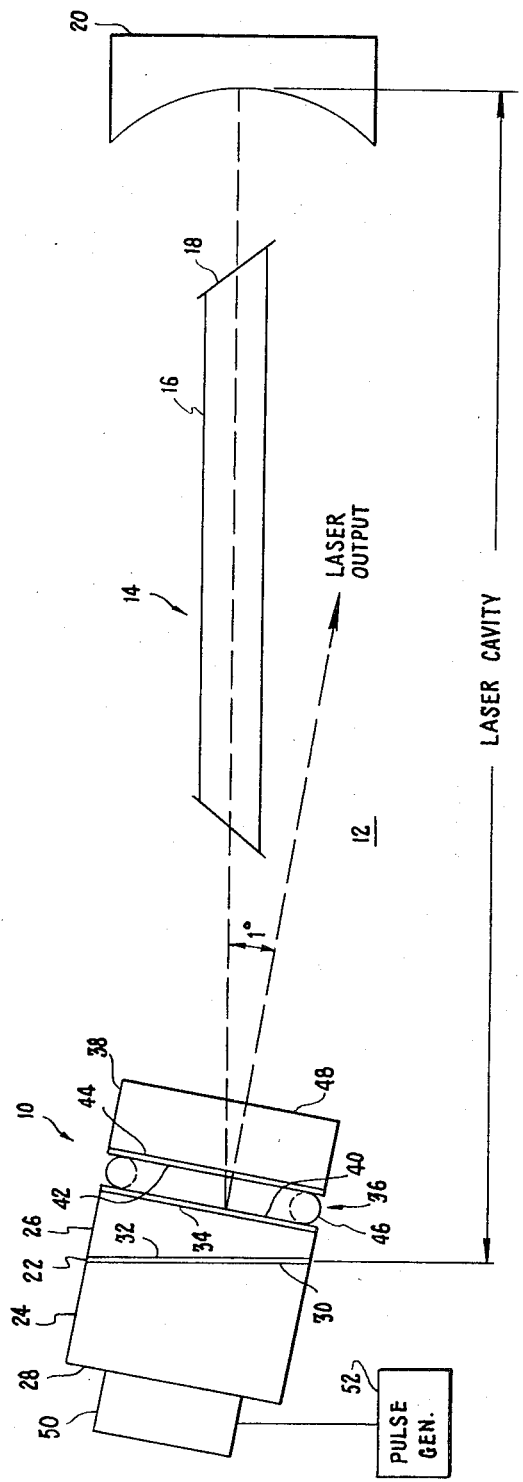

LASER PULSE TIME MODULATION Q-SWITCH

BACKGROUND OF THE INVENTION

This invention relates generally to Q-switching devices for lasers, and more particularly to pulse time modulation Q-switching devices for a carbon dioxide laser.

Presently, there are no other known devices that will perform pulse time modulation Q-switching of carbon dioxide lasers. In the general field of lasers, it has been the practice to employ a Kerr cell, a motor driven prism, or a bleachable dye to Q-switch a laser. Although such devices have served the purpose for some applications, they have disadvantages. The Kerr cell system introduces high losses in a resonant cavity. The motor driven prism cannot be synchronized with an outside event and is subject to double pulsing due to its low switching rate. The bleachable dye is subject to switching jitter and has no means of close synchronization with an outside event. Furthermore, prior art Q-switching devices cannot produce constant amplitude output pulses from carbon dioxide lasers over a wide range of repetition rates.

SUMMARY OF THE INVENTION

Accordingly, one object of the present invention is to provide a new and improved Q-switch for lasers.

Another object of the present invention is to provide a pulse time modulation Q-switch for carbon dioxide lasers.

Still another object of the present invention is the provision of a Q-switch capable of producing laser output pulses of constant amplitude over a wide range of repetition rates from carbon dioxide lasers.

A further object of the present invention is to provide a Q-switch device having pulse repetition rates up to the storage capacity of a carbon dioxide laser.

A still further object of the present invention is the provision of a Q-switch device that can produce a laser output pulse on demand of an electric signal.

Briefly, in accordance with one embodiment of this invention, these and other objects are attained by providing within a carbon dioxide laser cavity a mechanically shock excited Fabry-Perot interferometer that is positioned off-axis to the laser beam, and which is normally highly reflective, thereby preventing oscillation within the cavity. Upon being mechanically shock excited, the Fabry-Perot interferometer becomes highly transmissive, thereby enabling laser oscillation between the two laser end mirrors, which are aligned perpendicular to the laser beam. At the termination of the shock excitation, the Fabry-Perot interferometer returns to its normally highly reflective state, and a fixed amplitude, fixed width light pulse is reflected out of the laser cavity.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawing wherein the sole FIGURE is a pictorial view of the pulse time modulation Q-switch of the present invention used with a carbon dioxide laser.

DESCRIPTION OF THE PREFERRED EMBODIMENT

Referring now to the sole FIGURE, a pulse time modulation Q-switch 10 is shown positioned within a laser cavity 12. Within laser cavity 12 is a conventional carbon dioxide stimulator 14 having a glass envelope 16 and conventional Brewster angle windows 18 at both ends from which the laser light emerges. At one end of laser cavity 12 is a concave 100 percent reflective mirror 20 having, for example, a 10 meter focal length. At the other end of laser cavity 12 is a flat 100 percent reflective mirror 22. End mirrors 20 and 22 are aligned perpendicular to the laser beam from laser 14. End mirror 22 is supported between two wedges 24 and 26 of the same transparent material, such as germanium. These wedges must be of the same material for reasons described hereinafter. Wedges 24 and 26 are trapezoidal-shaped in cross-section, wedge 24 having non-parallel faces 28 and 30, and wedge 26 having non-parallel faces 32 and 34. Face 30 of wedge 24 and face 32 of wedge 26 are parallel to each other and abut against end mirror 22. In the preferred embodiment, end mirror 22 is a dielectric mirror that is deposited on face 32, and face 30 is then cemented to mirror 22. Face 28 of wedge 24 and face 34 of wedge 26 are parallel to each other and aligned at a small angle to the laser axis, for example, 1°. This angle is shown greatly exaggerated in the sole FIGURE for purposes of illustration only.

A Fabry-Perot interferometer 36 is sandwiched between wedge 26 and another transparent wedge 38 of the same material as wedges 24 and 26, such as germanium. It should be understood that the use of the word "transparent" with respect to wedges 24, 26 and 38 refers to the fact that these wedges are transparent to the wavelength of light produced by carbon dioxide stimulator 14.

Fabry-Perot interferometer 36 may be of the type described in U.S. Pat. application No. 612,301 on an invention entitled "Scanning Fabry-Perot Laser "Q" Switch," filed on Jan. 26, 1967 by A. M. Erickson, et al. Interferometer 36 has two flat, and parallelly aligned 65 percent dielectric mirrors 40 and 42. Mirror 40 is deposited on face 34 of wedge 26, and mirror 42 is deposited on a face 44 of wedge 38. Interferometer mirrors 40 and 42 are separated by a silicon dioxide ring 46 having a thickness equal to an odd multiple of $\lambda/2$, the half wavelength of the carbon dioxide laser light. Consequently, Fabry-Perot interferometer 36 appears highly reflective to the output of laser 14. A face 48 of wedge 38 which is closest to laser 14 is coated with a conventional anti-reflective material, so that it appears transparent to the carbon dioxide laser light. It should be understood that the space between mirrors 40 and 42 and within ring 46 of Fabry-Perot interferometer 36 is occupied by air. It should be further understood that Q-switch 10 is cylindrically shaped, so that when viewed along the longitudinal axis of Q-switch 10, all of the aforedescribed elements contained therein are circular shaped.

A ceramic piezoelectric crystal 50 is cemented to face 28 of wedge 24. One type of ceramic piezoelectric crystal suitable for use with the present invention, for example, is lead zirconate titanate. Crystal 50 is connected to a conventional pulse generator 52 which may be triggered in any manner well known in the art. A voltage pulse from pulse generator 52 causes ceramic crystal 50 to expand rapidly. This creates a mechanical shock wave that is transmitted through wedge 24, end mirror 22, and wedge 26 to mirror 40 of Fabry-Perot interferometer 36. This shock wave causes the center portion of mirror 40 to symmetrically and rapidly expand toward mirror 42, thereby decreasing the original mirror spacing of Fabry-Perot interferometer 36. This changes the optical characteristics of Fabry-Perot interferometer 36 from a normal state of being highly reflective to the light emitted by stimulator 14 to a state of being highly transmissive to the light from stimulator 14. It should be understood that Q-switch 10 is physically clamped by the appropriate devices, not shown, so that the shock wave from crystal 50 is transmitted to Fabry-Perot interferometer 36.

Carbon dioxide stimulator 14 is energized by a conventional laser pumping source, not shown, to the point where laser action would occur. However, due to the presence of Fabry-Perot interferometer 36, which is positioned off-axis to the laser beam and which is normally highly reflective, laser action cannot occur. When Fabry-Perot interferometer 36 is made highly transmissive in the aforedescribed manner, laser action occurs in cavity 12 between end mirrors 20 and 22. It should be understood that wedges 26 and 38 must be transparent to the carbon dioxide laser wavelength for proper laser action, and that, therefore, wedges 26 and 38 should be of the same material. Furthermore, wedges 24 and 26 must be made of the same material for proper transmission of the acoustic shock wave from crystal 50. Therefore, wedges 24, 26 and 38 must all be made of the same material.

During the short period of time when Fabry-Perot interferometer 36 is highly transmissive, stimulator 14 fills the laser cavity with electromagnetic radiation. When the shock wave terminates, mirror 40 returns to its original position and the Fabry-Perot interferometer again becomes highly reflective. The electromagnetic energy which has built up in laser cavity 12 is then reflected out at the slight angle at which Fabry-Perot interferometer 36 is aligned. Thus, for each pulse applied to ceramic crystal 50, Q-switch 10 produces a single output pulse of high peak and short duration.

For voltage pulses of constant peak amplitude applied to piezoelectric crystal 50, there will be corresponding constant peak amplitude and constant joule energy electromagnetic pulses emitted. The pulse repetition rate of pulse generator 52 can be varied in an intelligible manner for the purpose of providing a pulse time modulated laser output. It should be understood that in the present embodiment the laser pulse output repetition rate is limited only by the storage capacity of carbon dioxide laser 14, and not by Q-switch 10. For example, for a conventional carbon dioxide laser having a gain of approximately 1.1 which takes approximately 100 reflections to build up to the point where laser action occurs, the laser output will maintain a constant width and amplitude up to approximately 50,000 pulses per second. However, Q-switch 10 of the present invention has been found capable of operating up to 2.25 million pulses per second. It will be apparent that the present invention can be used for the purpose of providing a pulse time modulation laser communication system.

Obviously, numerous modifications and variations of the present invention are possible in the light of the above teachings. For example, germanium wedges 24, 26 and 38 could be replaced by other materials that will transmit the carbon dioxide laser wavelengths. It is therefore to be understood that within the scope of the appended claims, the invention may be practiced otherwise than as specifically described herein.

What is claimed as new and desired to be secured by Letters Patent of the United States is:

1. A pulse time modulated laser system comprising:
a carbon dioxide laser having a normally stimulated carbon dioxide stimulator and a pair of highly reflective end mirrors defining a laser cavity, said end mirrors being aligned to enable laser action;
a Fabry-Perot interferometer positioned within said laser cavity, normally highly reflective of the laser light emitted by said carbon dioxide stimulator, and positioned off-axis to said laser light to normally prevent laser action;
first means for producing mechanical shock waves in response to pulse time modulated voltage pulses; and
second means for producing mechanical one of said end mirrors and mechanically coupled to said first means and to said Fabry-Perot interferometer, whereby a mechanical shock wave produced by said first means is mechanically transmitted to said Fabry-Perot interferometer, causing said Fabry-Perot interferometer to briefly become highly transmissive of said laser light and thereby produce an output light pulse from said laser cavity.

2. The system of claim 1, wherein said first means comprises a piezoelectric crystal.

3. The system of claim 1, wherein said second means comprises a pair of wedges sandwiching said one of said end mirrors, said wedges being transparent to said laser light.

4. The system of claim 3, wherein said one of said end mirrors comprises a dielectric coating on one of said pair of wedges.

5. The system of claim 3, wherein said wedges are germanium wedges.

6. The system of claim 1, wherein said Fabry-Perot interferometer comprises:
a support member transparent to said laser light;
a pair of parallelly aligned dielectric mirrors, one of said dielectric mirrors being deposited on said second means and movable in response to said shock wave, and the other of said dielectric mirrors being deposited on said support member; and
a spacer ring normally separating said pair of dielectric mirrors by an odd multiple of half wavelengths of said laser light.

7. A pulse time modulation Q-switch comprising:
first means for producing mechanical shock waves in response to pulse time modulated voltage pulses;
a highly reflective flat mirror;
second means mechanically coupled to said first means for supporting said highly reflective flat mirror; and
a Fabry-Perot interferometer normally highly reflective of a predetermined wavelength of light and mechanically coupled to said second means, whereby a mechanical shock wave produced by said first means is mechanically transmitted to said Fabry-Perot interferometer, causing said Fabry-Perot interferometer to briefly become highly transmissive to said predetermined wavelength of light.

8. The Q-switch of claim 7, wherein said first means comprises a piezoelectric crystal.

9. The Q-switch of claim 7, wherein said second means comprises a pair of wedges sandwiching said mirror and transparent to said predetermined wavelength of light.

10. The Q-switch of claim 9, wherein said mirror comprises a dielectric mirror deposited on a face of one of said pair of wedges.

11. The Q-switch of claim 9 wherein said wedges are germanium wedges.

12. The Q-switch of claim 7, wherein said Fabry-Perot interferometer comprises:
a pair of parallelly aligned, partially reflective, flat mirrors, said pair of mirrors being non-parallelly aligned with said highly reflective flat mirror; and
a spacer ring normally separating said pair of mirrors by an odd multiple of half wavelengths of said predetermined wavelength of light.

* * * * *